*Bellairs & Barto,*

*Snap Hook,*

№ 55,229. Patented June 5, 1866.

Witnesses: Inventors:
Wm Bellairs
G. D. Barto
per Munn & Co
Attorneys

UNITED STATES PATENT OFFICE.

WILLIAM BELLAIRS AND OLIVER D. BARTO, OF ATKINSON, ILLINOIS.

IMPROVED SNAP-HOOK.

Specification forming part of Letters Patent No. 55,229, dated June 5, 1866.

*To all whom it may concern:*

Be it known that we, WILLIAM BELLAIRS and OLIVER D. BARTO, of Atkinson, in the county of Henry and State of Illinois, have invented a new and useful Improvement in Snap-Hooks; and we do hereby declare that the following is a full, clear, and exact description thereof, which will enable others skilled in the art to make and use the same, reference being had to the accompanying drawings, forming part of this specification, in which—

Figure 1:
Figure 2:
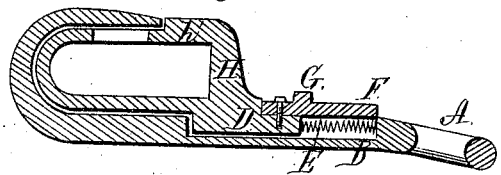
Figure 3:
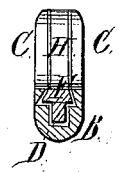
Figure 4:
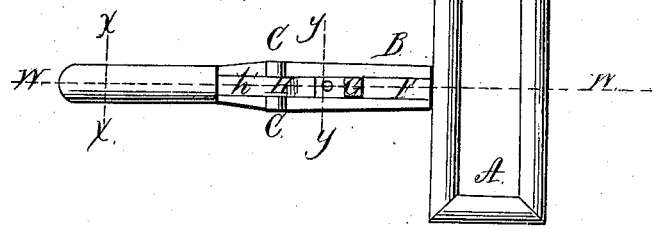

Figure 1 is a cross-section through the line $x\,x$, Fig. 4. Fig. 2 is a longitudinal section through the line $w\,w$, Fig. 4. Fig. 3 is a cross-section through the line $y\,y$, Fig. 4. Fig. 4 is a top view of our improved snap-hook.

Similar letters of reference indicate like parts.

Our invention has for its object to furnish a snap-hook, strong, simple in construction, not liable to get out of order, and easily put on and taken off the ring; and it consists of a double hook and spring combined and arranged as hereinafter more fully described.

A is the part of the snap-hook to which the strap is attached in the usual way. The shank B and the inside of the outer or main hook is channeled, as shown in Figs. 1, 2, and 3. Through the shank and a little past the projecting arms C of the outer hook the said channel is deepened, as shown in Fig. 2. The inner hook fits into the said groove or channel and slides therein. This inner hook has a projecting part, D, which fits into the deepened part of the channel in the outer hook, and is about half the length of said deepened part of the said channel. In the rear part of this deepened channel is placed a spiral spring, E, one end of which rests against the rear end of said deepened part of the channel, and the other end rests against the projecting part D of the inner hook, as shown. The spring is covered and protected by a slide, F, attached to the rear end of the inner hook and working in a dovetailed groove in the shank B of the outer hook, as shown in Fig. 3. Upon this piece or slide is formed a projection, G, for convenience in opening the hook for the admission of the ring.

The inner hook has an arm, H, the upright part of which corresponds with the arms C of the outer hook; but its upper part, $h'$, projects forward so as to meet and interlock with the end of the outer hook, as shown in Fig. 2.

When, in using the hook, it is desired to attach it to or remove it from a ring, the inner hook is drawn back by means of the projection G, and the ring inserted or removed, as desired. When the pressure upon the projection G is removed the spring E forces the inner hook forward, closing the opening between the end $h'$ of the arm H and the end of the outer hook. Any force applied to the ring or to the hook now draws the ring against the inner parts of both the outer and inner hooks, and tends to hold the hook more tightly locked.

We claim as new and desire to secure by Letters Patent—

The combination of the outer hook and the inner hook with its arm H, projection D, and dovetail slide F, spring E, and shank B, arranged and operating in the manner and for the purpose herein specified.

WILLIAM BELLAIRS.
OLIVER D. BARTO.

Witnesses:
D. L. MACHESNEY,
JAMES P. MACHESNEY.